J. W. KNOBLOCK.
COMBINED HOOK AND HANDLE FOR LANTERNS.
APPLICATION FILED MAR. 22, 1918.

1,301,574.

Patented Apr. 22, 1919.
2 SHEETS—SHEET 1.

James W. Knoblock
Inventor

By his Attorneys

J. W. KNOBLOCK.
COMBINED HOOK AND HANDLE FOR LANTERNS.
APPLICATION FILED MAR. 22, 1918.

1,301,574.

Patented Apr. 22, 1919.
2 SHEETS—SHEET 2.

James W. Knoblock
Inventor

By his Attorneys

UNITED STATES PATENT OFFICE.

JAMES W. KNOBLOCK, OF NEW YORK, N. Y., ASSIGNOR TO AMERICAN LA FRANCE FIRE ENGINE CO., INC., OF ELMIRA, NEW YORK, A CORPORATION OF NEW YORK.

COMBINED HOOK AND HANDLE FOR LANTERNS.

1,301,574.                Specification of Letters Patent.      Patented Apr. 22, 1919.

Original application filed June 19, 1917, Serial No. 175,626. Divided and this application filed March 22, 1918. Serial No. 223,964.

*To all whom it may concern:*

Be it known that I, JAMES W. KNOBLOCK, a citizen of the United States, residing at New York, in the county of New York and State of New York, have invented certain new and useful Improvements in Combined Hooks and Handles for Lanterns, of which the following is a full and clear specification.

This case, which is a division of my original application Serial No. 175,626, filed June 19th, 1917, for improvements in portable electric hand lanterns, covers a novel arrangement of handle bail and hook device for conveniently supporting a lantern or similar article whether it is carried in the hand or hung upon a suitable support.

In order that the invention may be fully understood I will first describe the same with reference to the accompanying drawings and afterward point out the novelty more particularly in the annexed claims.

In said drawing.

Figure 1:
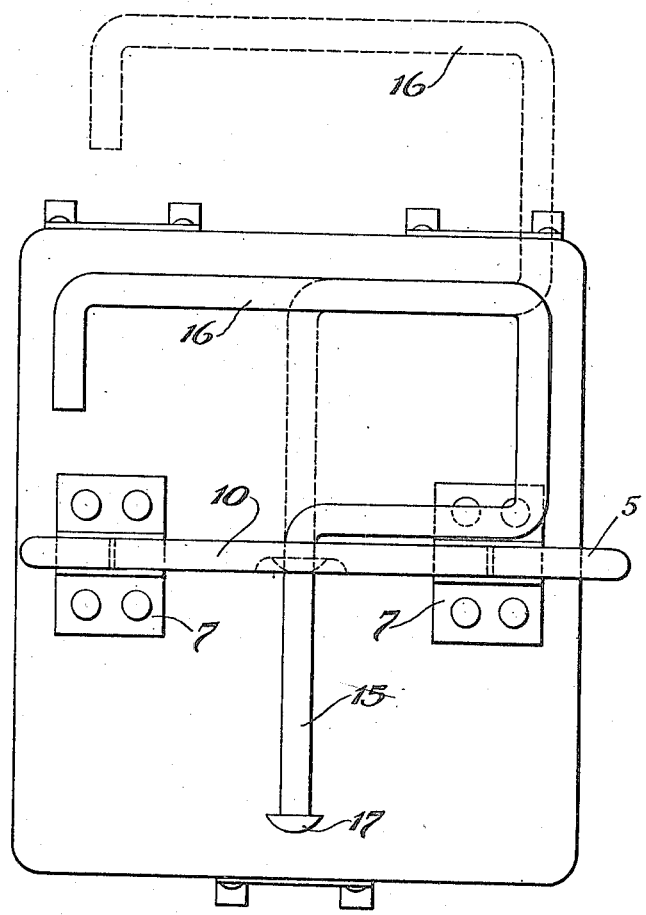
Figure 1 is a plan view of a lantern having the improved supporting bale and hook applied thereto.

In illustrating the present invention the top or cover portion of an electric hand lantern is shown with the improved combined hook and supporting bail properly mounted thereon, as illustrated in the above named original application. The particular form of lantern or other device to which the supporting devices are applied is immaterial to the nature of the present invention.

As shown in the drawings, 1 is the top or upper portion of a metal casing or container whether of a lantern or other device, to which the improved supporting and carrying bale and hook are applied.

The improved combined handle bail and hook has been designed for convenience in carrying the lamp or for hanging it up when desired. The handle bail 5, consisting of an ordinary metal wire loop having its inturned ends 6 journaled in the sheet metal socket pieces 7, riveted to the top of the container 1. This bail operates in the usual manner.

Coöperating with the loop bail 5, referred to is an adjustable hook consisting of a swiveled bar 10 freely journaled in the inner socket portions of members 7 and formed between its ends with a flattened perforated and widened web portion 11, through which extends the headed rod 15, of a rectangular hook member 16. The head 17 of the hook member is designed to rest in the flattened or expanded central portion 11 of the bar 10 when the hook is in operation.

Figure 2:
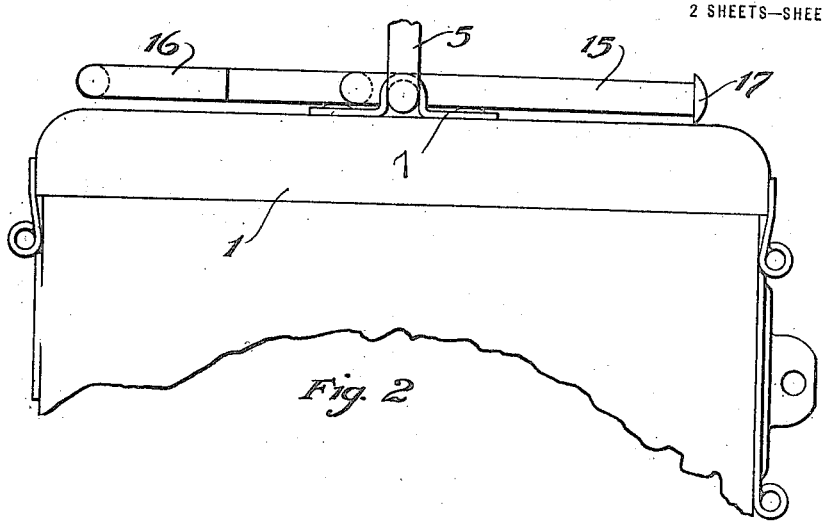
Fig. 2 is a side elevation of the same.
Figure 3:
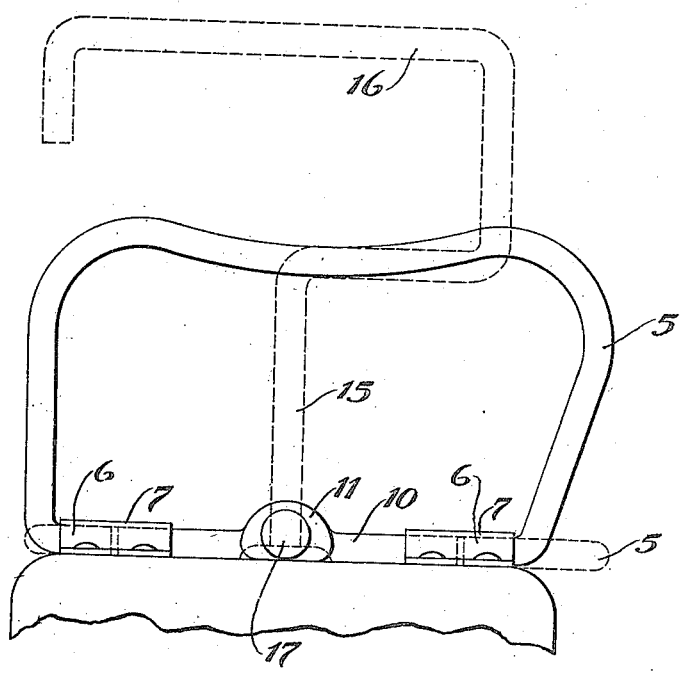
Fig. 3 is a front view of the same.

When the handle bail 5 is raised and in use the hook member 15, 16 lies flat against the top of the casing 1, as shown in Figs. 1 and 2 of the drawings, the headed rod end 15 being moved to the left through the opening in swivel rod 10 to allow the hook portion to rest against the lamp cover. When it is desired to extend the hook into operative position, the bail member 5 is turned down against the top of the casing and the hook member 15, 16, moved to the right through the swivel member 10 until the head 17 is seated within the recessed face of the web 11, which will free the head from engagement with the casing and enable the operator to raise the hook by rotating the swivel bar 10, presenting the head between the bar 10 and casing and the hook extending vertically above the casing. The hook can be used as a handle for carrying the lamp or it can be engaged with any convenient object for supporting the lamp in a stationary position.

I claim:

1. In a device of the character described, the combination of a casing, with a transversely perforated bar swiveled upon said casing, and a suspending device formed with a headed rod portion extending through and movable in the perforation of said swiveled bar.

2. In a device of the character described, the combination of a casing, with a handle bail pivotally mounted upon said casing, a bar swiveled upon said casing, and a hook having a headed rod extending through an opening in said swivel bar and having sliding engagement therewith.

3. In a device of the character described, the combination of a lamp casing, with a bail, ears secured to the casing and engaging said bail for hinging it to the casing, a swivel bar engaged by said ears within the bail, said bar formed with a central perforated flattened web and a hook formed with a headed rod, extending through the opening of said swivel bar, whereby both the bail and hook can be adjusted into position against the casing or extended into operative relation thereto.

JAMES W. KNOBLOCK.

Copies of this patent may be obtained for five cents each, by addressing the "Commissioner of Patents, Washington, D. C."